(12) United States Patent
Singh et al.

(10) Patent No.: US 11,113,461 B2
(45) Date of Patent: Sep. 7, 2021

(54) GENERATING EDIT SUGGESTIONS FOR TRANSFORMING DIGITAL DOCUMENTS

(71) Applicant: Adobe Inc., San Jose, CA (US)

(72) Inventors: Harpreet Singh, San Jose, CA (US); Harpreet Singh, Noida (IN)

(73) Assignee: Adobe Inc., San Jose, CA (US)

(*) Notice: Subject to any disclaimer, the term of this patent is extended or adjusted under 35 U.S.C. 154(b) by 62 days.

(21) Appl. No.: 16/531,888

(22) Filed: Aug. 5, 2019

(65) Prior Publication Data
US 2021/0042384 A1    Feb. 11, 2021

(51) Int. Cl.
*G06F 40/166* (2020.01)
*G06F 16/957* (2019.01)
*G06F 40/106* (2020.01)
*G06F 40/114* (2020.01)
*G06F 40/117* (2020.01)

(52) U.S. Cl.
CPC ........ *G06F 40/166* (2020.01); *G06F 16/9577* (2019.01); *G06F 40/106* (2020.01); *G06F 40/114* (2020.01); *G06F 40/117* (2020.01)

(58) Field of Classification Search
CPC .... G06F 40/166; G06F 40/114; G06F 40/117; G06F 40/106; G06F 16/9577
See application file for complete search history.

(56) References Cited

U.S. PATENT DOCUMENTS

| | | | |
|---|---|---|---|
| 9,881,010 B1* | 1/2018 | Gubin | G06F 16/93 |
| 2015/0160931 A1* | 6/2015 | Glazer | G06F 9/452 |
| | | | 717/109 |
| 2017/0083495 A1* | 3/2017 | Wan | H04L 63/08 |
| 2019/0026280 A1* | 1/2019 | Aviyam | G06N 20/00 |
| 2020/0372105 A1* | 11/2020 | Gerges | G06F 40/232 |
| 2020/0380067 A1* | 12/2020 | Religa | G06F 40/30 |

* cited by examiner

*Primary Examiner* — Thu V Huynh
(74) *Attorney, Agent, or Firm* — FIG. 1 Patents

(57) ABSTRACT

Techniques for generating edit suggestions for transforming digital documents are implemented in a digital medium environment. According to various implementations, a digital document is parsed to extract a digital page, and page elements of the digital page that are editable. A graphical user interface (GUI) is then output that identifies the page elements that are editable. The GUI, for instance, includes a suggestions menu with different edit suggestions that each correlate to different respective page elements. A user may then interact with individual edit suggestions to edit the different page elements, such as by adding, removing, or revising digital content of the page elements. The described techniques, for example, automatically identify editable page elements of a digital page and output edit suggestions for editing the page elements.

20 Claims, 12 Drawing Sheets

GENERATING EDIT SUGGESTIONS FOR TRANSFORMING DIGITAL DOCUMENTS

BACKGROUND

A variety of different systems are available for creating and publishing digital documents, including web pages, social media platforms, online sales platforms, and so forth. For instance, content creation systems enable users to generate and arrange digital content such as digital images, text, and multimedia to create different digital documents. The digital documents can then be published for general online access.

While conventional content creation systems enable a wide variety of different digital documents to be created and published, they lack the ability to provide techniques for generating and editing digital content that don't require some form of technical knowledge on the part of a user. For instance, consider a scenario where a user wishes to edit visual aspects of a web page. In a conventional content creation system, the user would typically be required to have technical knowledge of different element types and how they relate to the structure and appearance of the web page. To edit a Hypertext Markup Language (HTML) document, for example, a user would typically be required to leverage an <img> tag to edit digital images, a <div> tag to manage groups of web page elements, and so forth. Thus, conventional content creation systems require manual user interaction via complicated content languages and are thus inefficient from both user and system perspectives.

In addition to requiring technical knowledge by a user, conventional systems fail to provide guidance regarding how different attributes of a digital document are editable. For instance, consider a web page of an online sales platform that offers a particular item for sale. The web page includes a variety of different visual features, such as a banner, a picture of the item for sale, an item description box, an item price, and so forth. Further, the visual features have different visual attributes, such as size, color, and position on the web page. While conventional content creation systems enable the different visual features and attributes to be edited, such systems typically do not provide guidance regarding which of the features are editable, and how editing particular features may affect an overall impression of the web page.

Thus, conventional content creation systems typically require a considerable technical knowledge and time expenditure on a user's part to understand which features of a digital document are editable, and how editing the features may affect the digital document. In addition to requiring considerable human resources, such conventional systems consume excessive system resources as well. For instance, processor and memory resources that would otherwise be available for other computing tasks may be relegated to the repetitive task of responding to user input while the user is attempting to determine which elements of a digital document are editable, and how editing the elements affects the digital document. This causes such system resources to be less available or unavailable for other computing tasks. Thus, techniques utilized by conventional content creation systems for enabling digital documents to be generated and edited are inefficient both from a user workflow perspective, and from a system resources perspective.

SUMMARY

To overcome these problems, techniques for generating edit suggestions for transforming digital documents are implemented in a digital medium environment. For instance, a user leverages a content editor application to retrieve a digital document for editing, such as a web page. The content editor application parses the digital document to extract a digital page, and page elements of the digital page that are editable. The content editor application then outputs a graphical user interface (GUI) that identifies the page elements that are editable. The GUI, for instance, includes a suggestions menu with different edit suggestions that each correlate to different respective page elements. A user may then interact with individual edit suggestions to edit the different page elements, such as by adding, removing, or revising digital content of the page elements. The described techniques, for example, automatically identify editable page elements of a digital page, and output edit suggestions for editing the page elements without requiring user selection of the page elements or even user knowledge of which page elements are editable.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
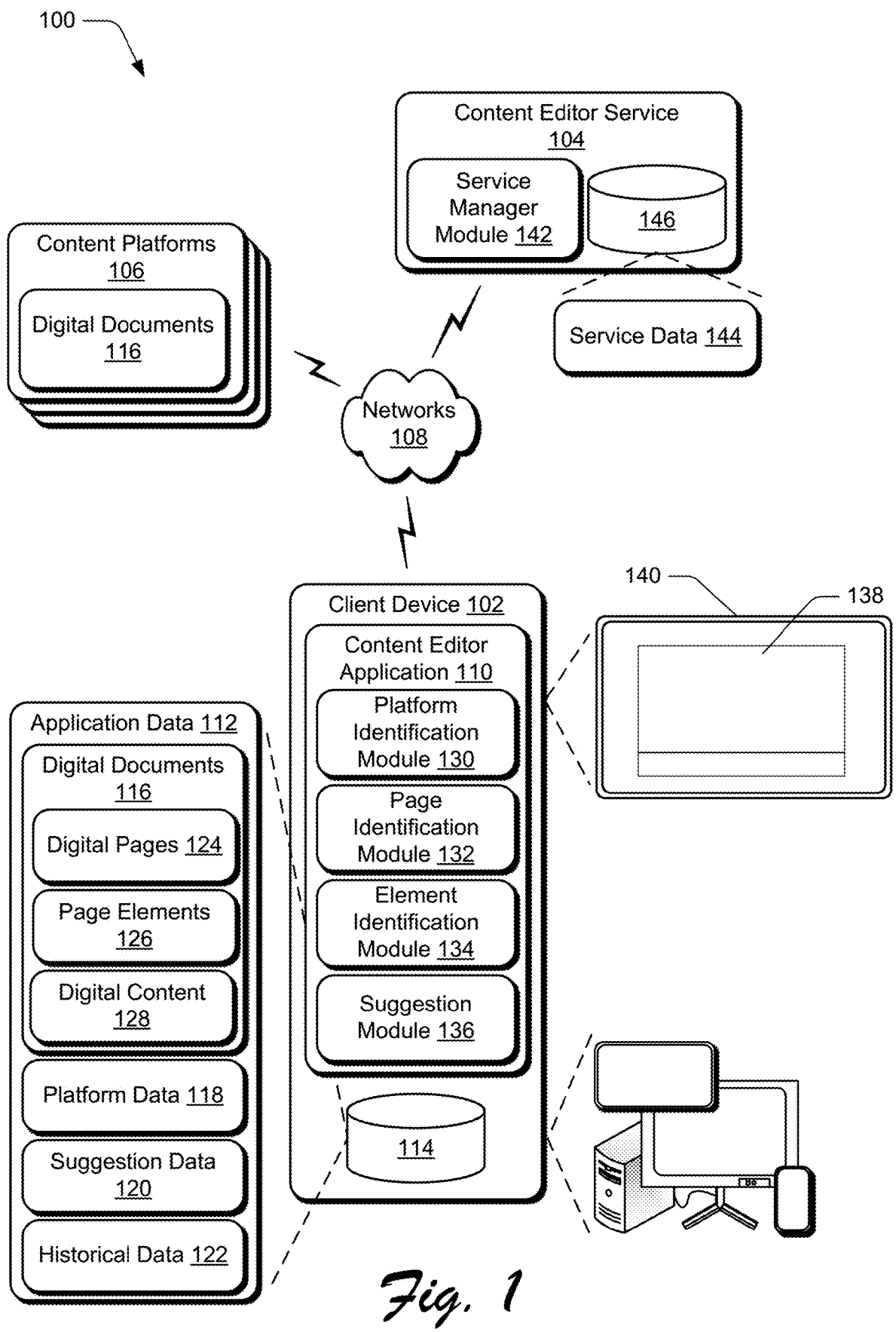
FIG. 1 is an illustration of an environment in an example implementation that is operable to employ techniques described herein.

Conventional content editing systems that provide digital document editing functionality typically enable a user to apply various edits to a digital document to generate an edited version of the digital document. Such conventional systems, however, do not typically provide functionality for efficiently and intuitively demonstrating how a digital document is editable. Thus, conventional content editing systems are burdensome on user and system resources by requiring extensive user interaction to discover how a particular digital document is editable, and to apply edits to the digital document. Further, by requiring extensive manual user interaction to edit digital documents, such conventional systems prevent system resources (e.g., processor and memory bandwidth) allocated to the manual processes from being available for other system tasks.

To overcome these drawbacks with conventional content editing systems, techniques for generating edit suggestions for transforming digital documents are implemented in a digital medium environment. For instance, a user leverages a content editor application to retrieve a digital document for editing, such as a web page. The content editor application parses the digital document to extract a digital page, and page elements of the digital page that are editable. The content editor application then outputs a graphical user interface (GUI) that identifies the page elements that are editable. The GUI, for instance, includes a suggestions menu with different edit suggestions that each correlate to different respective page elements. A user may then interact with individual edit suggestions to edit the different page elements, such as by adding, removing, or revising digital content of the page elements. In at least some implementations, the edit suggestions are presented as interactive objects separately from the page elements, and a user may edit the page elements via interaction with the edit suggestions and without interacting directly with the page elements. Generally, techniques described herein can automatically identify editable page elements of a digital page and output edit suggestions for editing the page elements without requiring user selection of the page elements or even user knowledge of which page elements are editable.

Further, the described techniques provide recommendations for ways in which to edit page elements, such as page elements identified as part of a set of editable page elements. For instance, when a particular edit is applied to a digital document and the digital document is published, performance of the digital document is monitored to generate performance data that indicates how the digital document performs over a period of time. Generally, "performance" is measurable based on quantities of user interactions with the digital document, such as user accesses, purchases, registrations, recommendations, and so forth, pertaining to a digital document. The performance data can then be used to generate recommendations of ways for editing other digital documents. For example, consider that after the digital document was edited and published, performance of the digital document was observed to increase. The increase in performance can be attributed to the particular edit, and thus the edit can be recommended for other digital documents. For instance, when a user interacts with a content editor application to edit a digital document, the content editor application can present the edit as a recommendation for editing the digital document.

In this way, techniques for generating edit suggestions for transforming digital documents provide automated processes for generating and outputting edit suggestions that present different ways for editing and transforming digital documents. By providing automated identification of editable page elements and outputting interactive edit suggestions for the page elements, the disclosed techniques greatly reduce the number of user interactions and system resources required to enable digital document editing in comparison with conventional content editing systems. Thus, a more efficient content editor experience is provided that conserves system resources as well as user time and interaction required to discover ways for editing digital documents.

Term Descriptions

These term descriptions are provided for purposes of example only and are not intended to be construed as limiting on the scope of the claims.

As used herein, the term "digital document" refers to digital collections of digital content, such as generated using images, text, animations, videos, audio, and so forth. Examples of digital documents include markup-based documents such as websites and web platforms for various purposes such as eCommerce, social media, education, government entities, and so forth. A digital document can be published for access in different ways, such as by an online content platform that publishes digital documents for online access over the Internet.

As used herein, the term "digital page" refers to a portion of a digital document, such as a web page of a website. In at least some implementations, a digital document can be made up of multiple digital pages, and each digital page can be populated with different types and instances of digital content. For instance, a website includes different types of digital pages such as a home page, a directory page, a product page, a contact page, and so forth.

As used herein, the term "page type" refers to a classification of a digital page. For instance, different page types are defined for different digital pages, such as based on a purpose of a digital page within a digital document, and/or a type of digital content included in a digital page. Examples of different page types include a "home page" which represents an initial and/or main page of a digital document, a "directory page" that identifies different instances and categories of digital pages of a digital document (e.g., which includes links to other digital pages of the digital document), a "product page" which includes digital content pertaining to a product offered by a digital document, a "contact page" which enables a user to initiate contact with an entity associated with a digital document, and so forth.

As used herein, the term "page element" refers to different digital constructs that make up a digital page. A page element, for instance, can be populated with digital content to form a digital page. Examples of page elements include bounding boxes, controls, Tillable fields, menus, and so forth. Generally, a user can generate and edit a digital page by arranging different page elements on the digital page, and inserting and/or editing digital content for the individual page elements.

As used herein, the term "content platform" refers to network-based entities that publish digital documents. Examples of content platforms include eCommerce platforms (e.g., Magento®, Shopify®), social media platforms (e.g., Facebook®, Twitter®), educational platforms (e.g., Udemy®), and so forth. A user, for instance, can generate and edit a digital document, and provide the digital document to a content platform. The content platform can then publish the digital document for access by different users, such as via the Internet.

As used herein, the term "edit suggestion" refers to indications of different page elements that are editable. For instance, different page elements of a digital page can be extracted and identified (e.g., visually emphasized) using edit suggestions that indicate that the page elements are editable. In at least some implementations, an edit suggestion represents a visual interactive object that is able to receive user input to edit a respective page element represented by the edit suggestion.

As used herein, the term "edit interaction" refers to interactions with page elements to edit the page elements, such as by adding or removing digital content, and/or revising existing digital content. An edit interaction, for example, is based on user input to a content editor application to edit digital content included in page elements of a digital page.

As used herein, the term "edit recommendation" refers to a recommended way for editing a page element. An edit recommendation, for instance, includes plain text guidance for editing a page element, and is specific to a particular page element. As used herein, for example, an edit suggestion identifies a page element that is editable, and an edit recommendation provides guidance for editing the page element.

As used herein, the term "performance data" refers to data that describes how a particular digital document and/or digital page performs in an online environment, such as over the Internet. Examples of performance data include a number of user accesses, purchases, registrations, recommendations, and so forth, pertaining to a digital document and/or a digital page. In at least some implementations, performance data can be dated to indicate performance and changes in performance over specific periods of time.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques for generating edit suggestions for transforming digital documents described herein. The illustrated environment 100 includes a client device 102, a content editor service system ("content editor service") 104, and content platforms 106 that are communicatively coupled, one to another, via networks 108.

Computing devices that are usable to implement the client device 102, the content editor service 104, and the content platforms 106 may be configured in a variety of ways, such as a desktop computer, a laptop computer, a mobile device (e.g., assuming a handheld configuration such as a tablet or mobile phone), a server device, and so forth. Additionally, a computing device may be representative of a plurality of different devices, such as multiple servers utilized to perform operations via a network-based service (e.g., "over the cloud") as further described in relation to FIG. 12.

The client device 102 includes a content editor application 110 that is representative of functionality to perform various editing interactions with digital documents, such as for generating and editing digital documents. Further to techniques described herein, the content editor application 110 maintains application data 112 stored on a local storage 114 and which includes digital documents 116, platform data 118, suggestion data 120, and historical data 122. The digital documents 116 are representative of various collections of digital content, and may be implemented in a variety of different digital content formats. Generally, the digital documents 116 may take various forms, such as websites, web applications, social media pages, and so forth.

The digital documents 116 include digital pages 124, page elements 126, and digital content 128 which are leveraged to generate different instances of the digital documents 116. The pages 124, for instance, represent different divisions of a digital document 116, such as web pages of a website, pages of a multimedia document, posts to a social media platform, and so forth. The page elements 126 represent different visual and functional elements of the digital documents 116, such as banners, menus, functional controls (e.g., selectable buttons), content containers, search fields, and so forth. The page elements 126, for example, represent different visual features used to generate the pages 124.

In at least some implementations, the page elements 126 are arranged into different categories to facilitate editing of the page elements according to techniques for generating edit suggestions for transforming digital documents. The categories, for instance, represent different types of page elements 126, such as "page banner," "menu," "control," "container," "search field," and so forth. Further, different types of page elements 126 can be associated with different types of the digital pages 124. Examples of different types of digital pages 124 include "home page," "product page," "registration page," "contact page," and so forth. Generally, different types of page elements 126 can be associated with different types of digital pages 124, which facilitates identification of page elements 126 for purposes of editing the page elements.

The digital content 128 represents content that can be populated to the elements 126 and the pages 124 as part of generating and editing the digital documents 116. Examples of the digital content 128 include images, text, audio, video, multimedia, and so on. Generally, the content editor application 110 enables the digital content 128 to be manipulated in various ways to generate and edit the digital documents 116.

The suggestion data 120 represents data that can be leveraged by the content editor application 110 to suggest different ways in which a digital document 116 can be created and edited. For instance, the suggestion data 120 includes data that can be output by the content editor application 110 to provide suggestions and recommendations to users regarding ways in which the digital content 128 can be manipulated to edit instances of the digital documents 116.

The platform data 118 represents data that is usable to identify and differentiate the different content platforms 106. As further described below, certain of the content platforms 106 can have platform-specific attributes that can be leveraged to determine ways in which digital documents served by the content platforms 106 can be generated and edited. The platform data 118, for instance, includes metadata (e.g., meta tags) that can be matched to attributes of a digital document to identify a content platform 106 that publishes the digital document.

The historical data 122 represents data that tracks different historical attributes of the digital documents 116 and the digital content 128. For instance, the historical data 122 tracks historical performance and metrics of the digital documents 116, such as a number of online accesses over a period of time, a number of product sales resulting from instances of the digital documents 116, user feedback regarding instances of the digital documents 116, a number of click-throughs occurring from a digital document 116, user sentiment regarding the digital documents, and so forth. In at least some implementations, the historical data 122 can be leveraged to generate the suggestion data 120. For instance, if the historical data 122 indicates that a particular edit applied to the digital content 128 caused an increase in performance of a digital document 116, the suggestion data 120 can be configured generate a recommendation to apply a similar edit to another instance of a digital document 116.

Further to techniques for generating edit suggestions for transforming digital documents, the content editor application 110 includes a platform identification module 130, a page identification module 132, an element identification module 134, and a suggestion module 136 that each provide different aspects of the functionality described herein. The platform identification module 130, for instance, represents functionality for identifying which of the content platforms 106 a particular digital document 116 is associated with. To correlate a particular digital document with a content platform 106, the platform identification module 130 can leverage the platform data 118 to match known digital document attributes (e.g., metadata) for a content platform 106 to attributes of the digital document.

In at least some implementations, digital documents 116 that are generated and edited by the content editor application 110 can be served to different users by the content platforms 106. Generally, the content platforms 106 represent different online platforms such as websites, social media platforms, eCommerce platforms, and so forth. The content platforms 106, for example, publish digital documents 116 which include instances of the digital documents 116 generated and/or edited by the content editor application 110. For instance, the client device 102 retrieves an instance of a digital document 116 from a content platform 106, edits the digital document 116 to generate an edited instance of a digital document 116, and then communicates the edited digital document 116 to the content platform 106 for publishing.

The page identification module 132 represents functionality for identifying different page types for the pages 124. Examples of different page types that the page identification module 132 is able to identify include home pages of a website, product pages of an eCommerce platform, custom page types identified for different online platforms, and so forth. The element identification module 134 represents functionality for identifying different element types for the elements 126, examples of which are discussed above.

The suggestion module 136 represents functionality for generating and exposing the suggestion data 120. For instance, the suggestion module 136 can generate the suggestion data 120 (e.g., based on the historical data 122), and can output the suggestion data 120 to suggest different ways in which the digital documents 116 can be edited. As further described below, the suggestion module 136 can output the suggestion data 120 based on different attributes of the digital documents 116, such as page types identified by the page identification module 132, element types identified by the element identification module 134, and so forth.

To enable users to interact with the content editor application 110, the content editor application 110 includes a content editor graphical user interface ("GUI") 138 displayed on display device 140 of the client device 102. The content editor GUI 138 is representative of functionality to present various visual affordances and user experiences as part of interacting with the content editor application 110.

In at least some implementations, certain content editing actions and user experiences of the content editor application 110 can be performed in part or wholly by the content editor service 104. The content editor service 104, for example, represents a network-based service that can assist the client device 102 in performing various content editing actions via the content editor application 110. To enable the content editor service 104 to perform such actions, the content editor service 104 maintains a service manager module 142 and service data 144 stored on a system storage 146. Generally, the service manager module 142 is representative of functionality for performing actions as part of techniques for generating edit suggestions for transforming digital documents described herein. For instance, the various interactions and user experiences described herein can be implemented at the client device 102, the content editor service 104, and/or via interaction between the client device 102 and the content editor service 104 over the networks 108. Further, the various data stored on the local storage 114 of the client device 102 may additionally or alternatively be stored as part of the service data 144 for access by the content editor service 104 and/or the client device 102.

Figure 2:
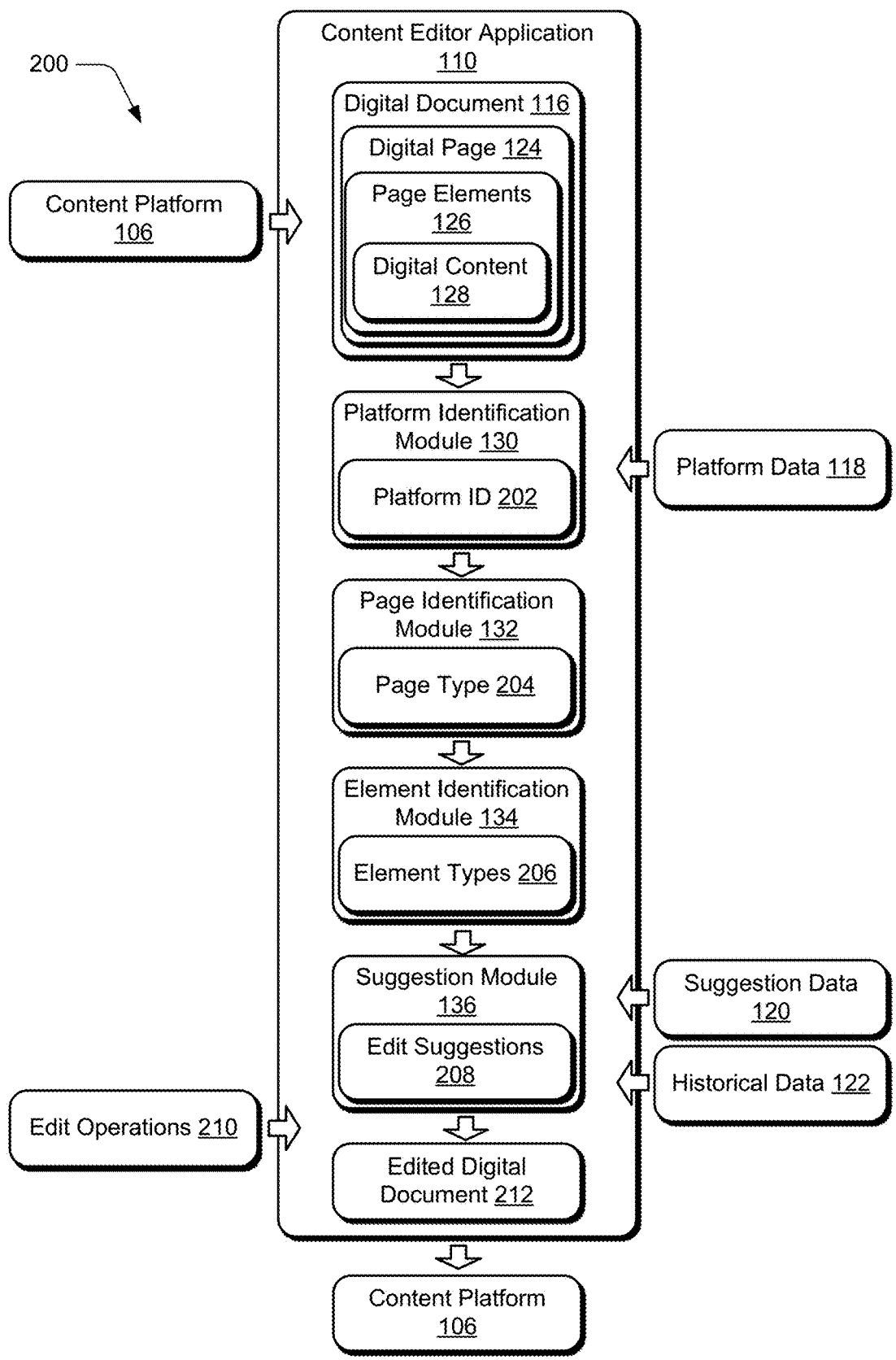
FIG. 2 depicts portions of a content editor system which enables different user experiences to be generated utilizing techniques for generating edit suggestions for transforming digital documents described herein.

FIG. 2 depicts portions of a content editor system 200 in an example implementation for transforming a digital document utilizing techniques described herein. In the system 200, the content editor application 110 obtains a digital document 116 from a content platform 106. A user, for instance, interacts with the content editor application 110 to provide input to retrieve the digital document 116 from the content platform 106. Alternatively or additionally, the digital document 116 is stored on the client device 102 and the user retrieves the digital document 116 from the local storage 114. The digital document 116 includes a digital page 124 with page elements 126 and digital content 128.

The platform identification module 130 then processes the digital document 116 to determine a platform identifier ("ID") 202 that identifies the content platform 106. For instance, the platform identification module 130 utilizes the platform data 118 to inspect data (e.g., metadata) of the digital document 116, and match the data to a known data signature of the content platform 106 to ascertain the platform ID 202. The page identification module 132 then inspects the digital page 124 of the digital document 116 to determine a page type 204 for the digital page 124. In at least some implementations, the page identification module 132 leverages the platform data 118 to determine page types utilized by the content platform 106. Generally, different page types may affect how edits to the digital document 116 are suggested and/or applied.

Continuing, the element identification module 134 processes the page elements 126 of the digital page 124 to determine different element types 206 for the elements 126. The suggestion module 136 then generates edit suggestions 208 based on the platform ID 202, the page type 204, and element types 206. The edit suggestions 208, for example, are output via the content editor GUI 138. Generally, the edit suggestions 208 identify particular pages 124, elements 126, and/or digital content 128 that are editable to transform the digital document 116. As further detailed below, the edit suggestions 208 can be presented as interactive visual objects that are configured to receive user input to edit the digital content 128 populated to the various elements 126 of the digital document 116.

In at least some implementations, the suggestion module 136 leverages the suggestion data 120 and the historical data 122 to generate the edit suggestions 208. The suggestion data 120, for example, includes data describing different ways in which attributes of the digital document 116 are editable, such as the page 124, the elements 126, and/or the digital content 128. Further, the historical data 122 indicates performance-related data for previous ways in which digital documents were edited, such as how different types of edits affected performance of instances of digital documents. The suggestion module 136, for example, can recommend edits that have been historically observed as having contributed to an increase in performance of digital documents.

Based on the edit suggestions 208, a user performs edit operations 210 to the digital document 116 to generate an edited digital document 212. The edited digital document 212, for example, represents an edited instance of the digital document 116. The edited digital document 212 is then communicated to a content platform 106 for publishing.

Thus, as depicted in the system 200, techniques for generating edit suggestions for transforming digital documents can be employed to provide edit suggestions for editing digital documents, and to enable digital documents to be transformed by edits applied based on the edit suggestions.

Figure 3:
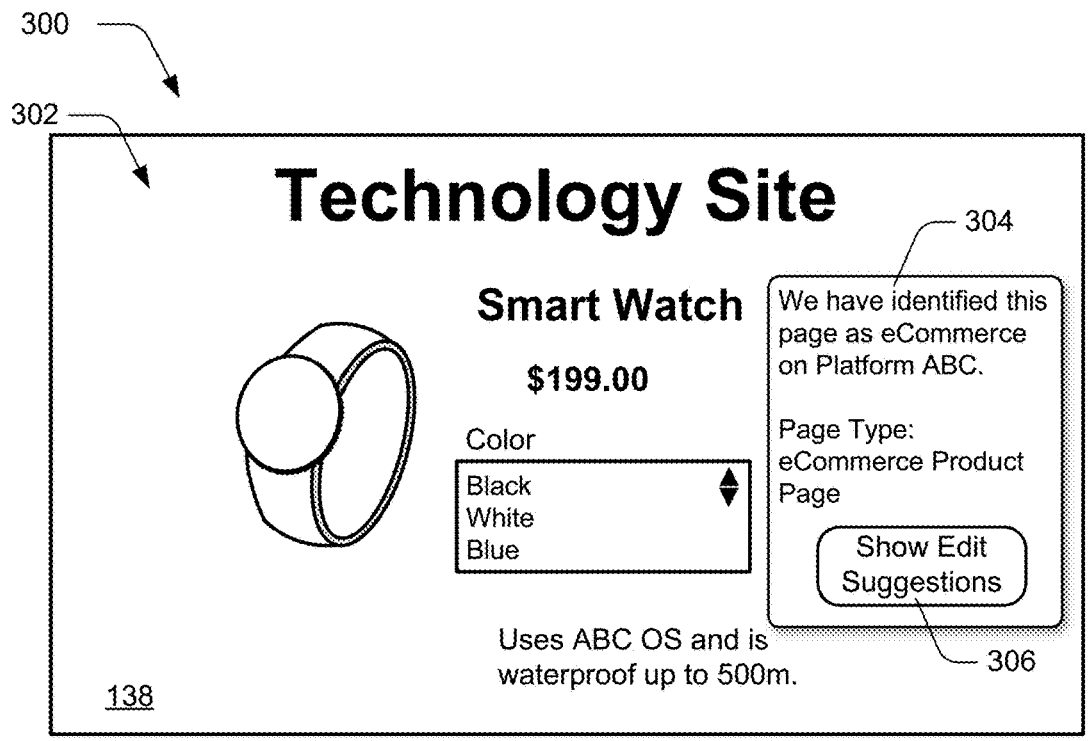
FIG. 3 depicts a scenario for initiating an edit mode for editing a digital document.
Figure 3:
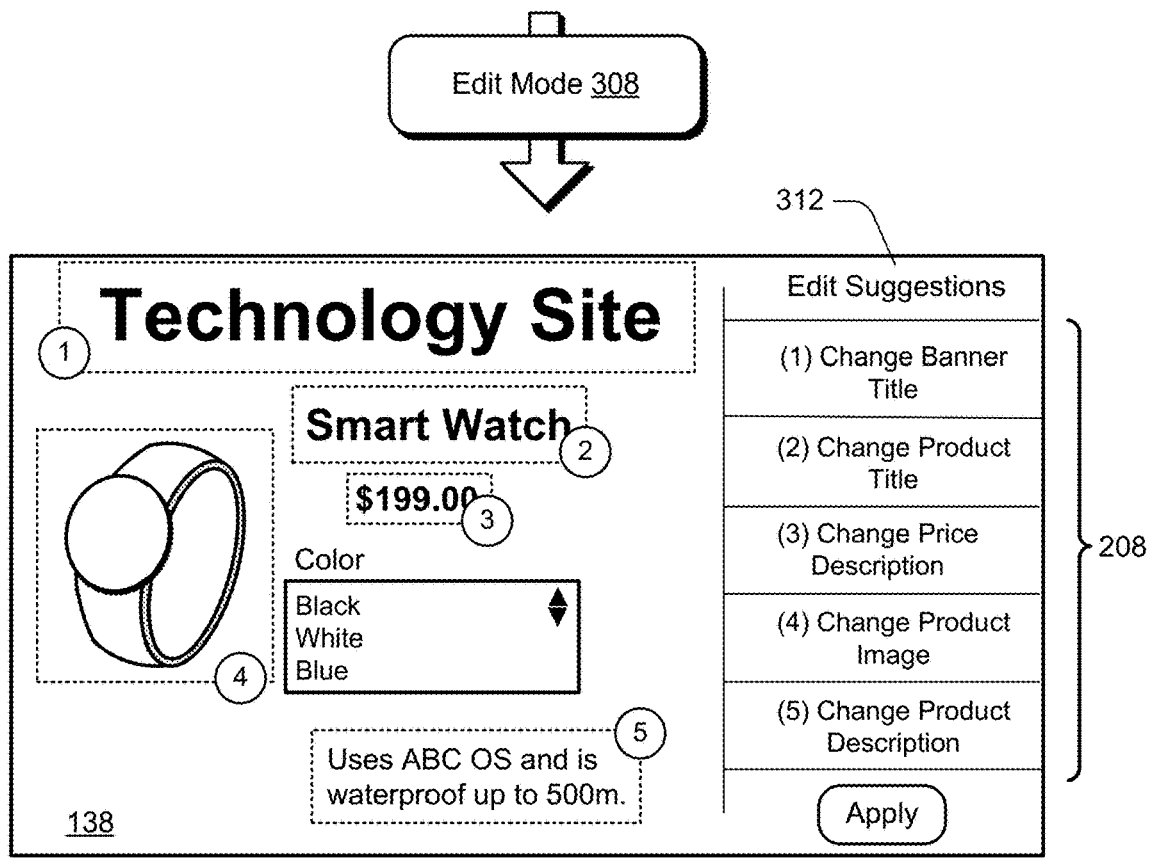

FIGS. 3-8 depict aspects of example scenarios for generating edit suggestions for transforming digital documents. For instance, FIG. 3 depicts a scenario 300 for initiating an edit mode for editing a digital document. In the scenario 300, a web page 302 is displayed on the content editor GUI 138 of the content editor application 110. Generally, the web page 302 represents an instance of a digital document 116. In at least one implementation, the web page 302 is displayed in response to a user interacting with the client device 102 to retrieve the web page 124 from a particular content platform 106.

The content editor application 110 processes the web page 302 to identify edit suggestions 208 that represent different attributes of the web page 302 that are editable. One example way of processing a digital document to identify edit suggestions is discussed above with reference to the scenario 200. Accordingly, the content editor application 110 presents an edit prompt 304 that identifies a content platform 106 that publishes the page ("Platform ABC") and a page type 204 for the page, "eCommerce Product Page." The edit prompt 304 also includes an edit suggestion control 306 that is selectable to initiate an edit mode for editing the web page 302.

Accordingly, based on selection of the suggestion control 306, an edit mode 308 is activated that enables the web page 302 to be edited via interaction with the content editor application 110. In at least one implementation, before the edit mode 308 is activated, an authentication process is performed to determine whether a particular user is authorized to edit the web page 302. Thus, the edit mode 308 can be activated based on a successful authentication.

In the edit mode 308, different editable elements 310 of the web page 302 are identified as being editable. The editable elements 310 are depicted as surrounded by dashed lines providing a visual indication that the elements are editable. Further, the editable elements 310 are labeled to differentiate from one another, such as using a different number for each editable element. An edit suggestions menu 312 is also presented, which lists different edit suggestions 208 based on the identified editable elements. For instance, individual editable elements 310 each include a different respective edit suggestion 208 listed in the suggestions menu 312. Generally, each edit suggestion 208 included in the suggestions menu 312 identifies a different editable element 310 and an action that can be applied to the editable element, e.g., "change" the editable element.

Figure 4:
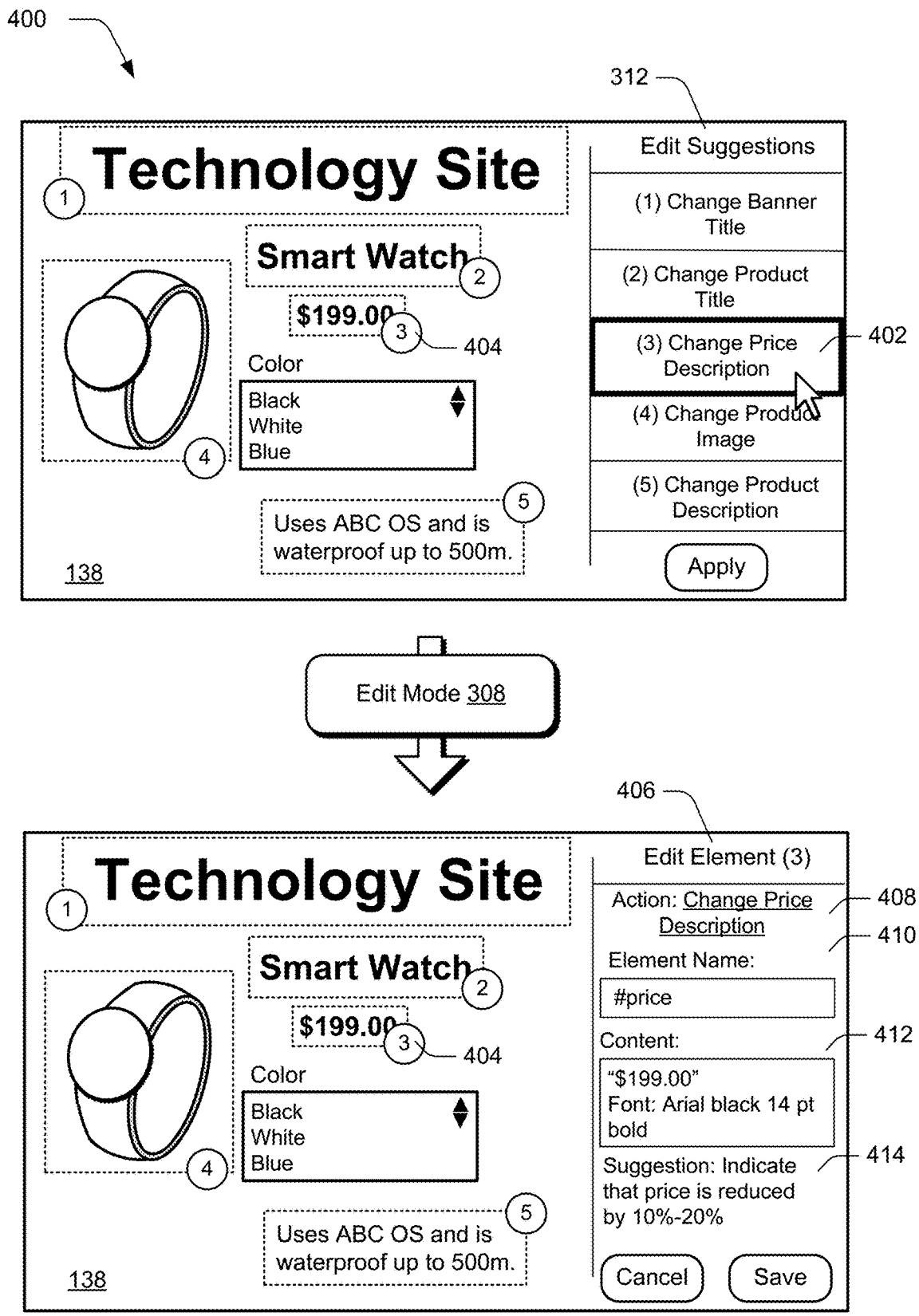
FIG. 4 depicts a scenario for selection of a particular element for editing.

FIG. 4 depicts a scenario 400 for selection of a particular element for editing. The scenario 400, for example, represents a continuation of the scenario 300 as part of the edit mode 308. In the scenario 400, a user selects a change price description option 402 from the suggestions menu 312 to enable an element 404 of the editable elements 310 to be edited. Based on selection of the option 402, an element editing menu 406 is presented that includes various information and editing options for the element 404. The element editing menu 406, for instance, includes an action field 408, an element name field 410, a content field 412, and a recommendation field 414. The action field 408 generally identifies an edit-related action that is available for editing the element 404, which in this example indicates that price description for a product presented in the web page 302 is editable. The element name field 410 identifies a name for the element 404. In at least some implementations, the name presented in the element name field 410 can be based on a written language and/or a markup language, such as Cascading Style Sheets (CSS).

The content field 412 includes content that is populated to the element 404, as well as attributes of the content. In this particular example, the content field 412 includes digital text content from the element 404, as well as attributes of the text content, e.g., font attributes. While this scenario is discussed with reference to text content, it is to be appreciated that various other types of digital content can be populated to the content field 412, such as images, video, audio, and so forth.

The recommendation field 414 includes recommendations for how to edit the element 404, such as particular ways to perform the action identified in the action field 408. In at least one implementation, the recommendation field 414 is populated based on information from suggestion data 120, which in turn can be generated based on the historical data 122. For instance, the historical data 122 indicates different historical performance statistics for changes made to product price fields of different digital documents 116, such as the effect of characterizing the product price in different ways on performance of respective digital documents. Thus, the recommendation field 414 can be populated with guidance for changing the element 404 that is historically indicated as leading to an increase in performance of similar digital documents.

Figure 5:
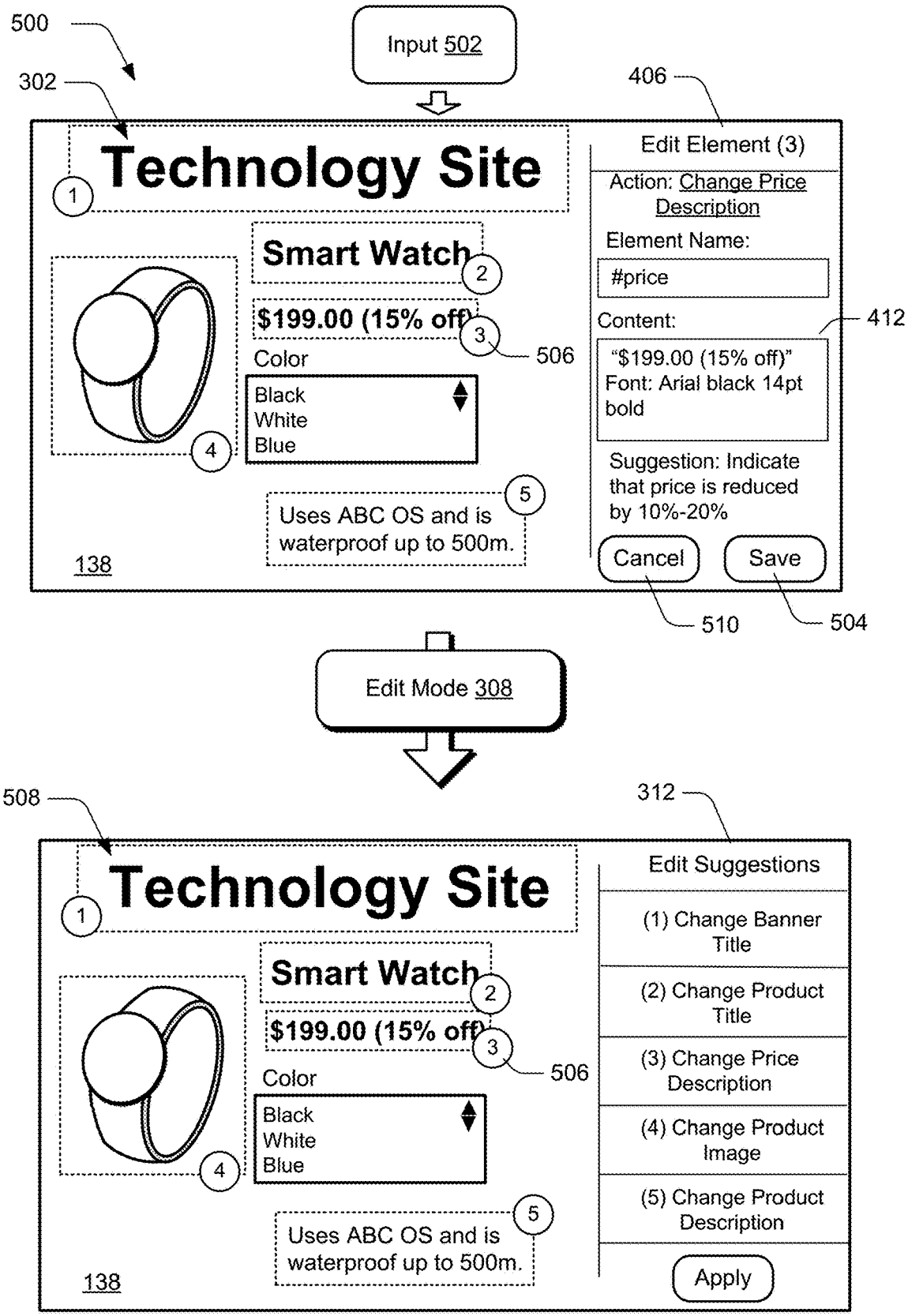
FIG. 5 depicts a scenario for applying edits to an element of a digital document.

FIG. 5 depicts a scenario 500 for applying edits to an element of a digital document. The scenario 500, for example, represents a continuation of the scenarios 300, 400 as part of the edit mode 308. In the scenario 500, a user provides input 502 to change the content included in the element 404, such as by editing the content via interaction with the content field 412 and/or the element 404 itself. The user then selects a save control 504, which causes the changes to the element 404 to be saved to generate an edited element 506. Accordingly, the element 404 is transformed via the user input 502 to generate an edited web page 508, which represents a modified version of the web page 302. The element editing menu 406 also includes a cancel control 510 that is selectable to cancel editing of the element 404, such as to cause the element editing menu 406 to be removed from display. Continuing, after the element 404 is edited, the suggestions menu 312 is presented to enable other elements of the edited web page 508 to be edited.

Figure 6:
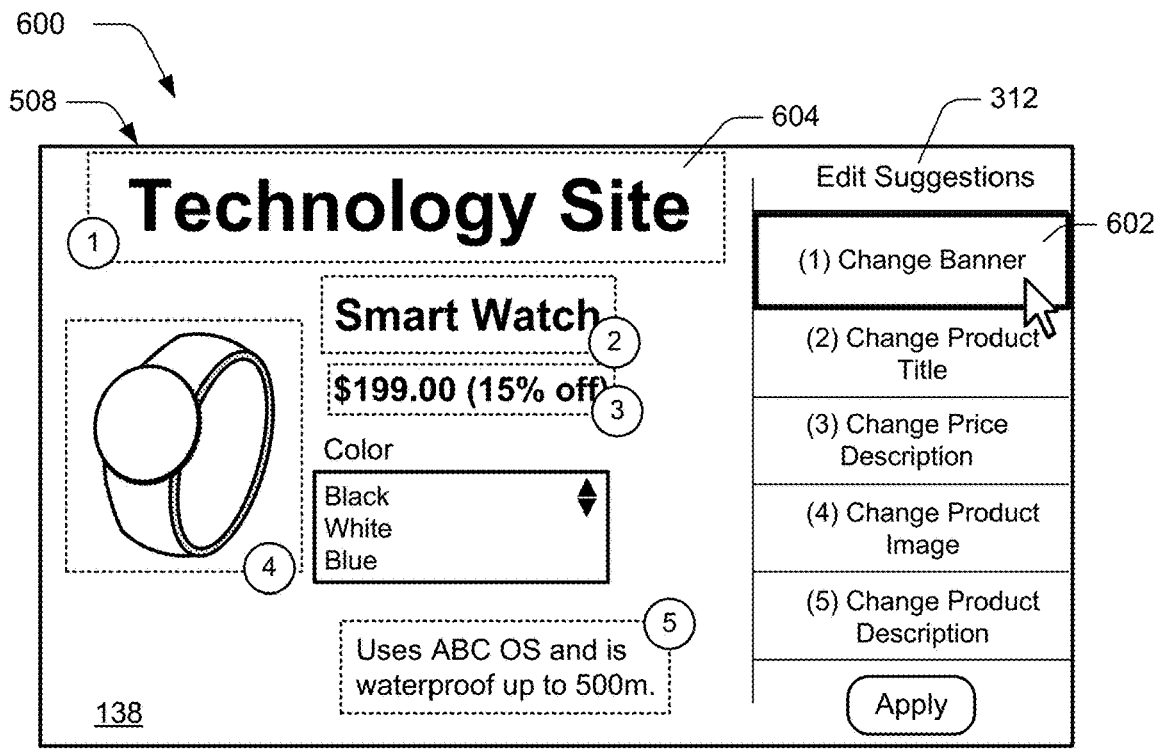
FIG. 6 depicts a scenario for selection of a particular element for editing.
Figure 6:
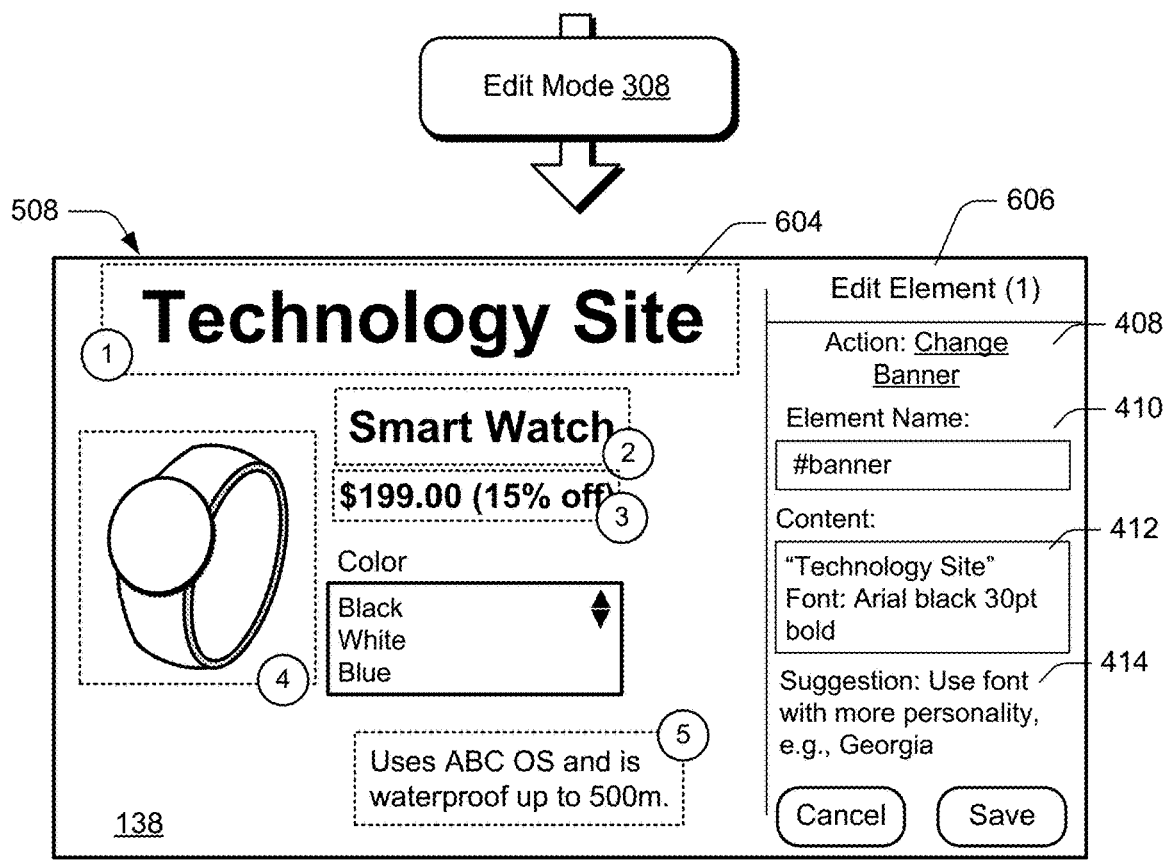

FIG. 6 depicts a scenario 600 for selection of a particular element for editing. The scenario 600, for example, represents a continuation of the scenarios 300-500 as part of the edit mode 308. In the scenario 600, the edited web page 508 is displayed in the content editor GUI 138 along with the suggestions menu 312.

Continuing, a user selects an edit suggestion 208 in the form of a change banner option 602 from the suggestions menu 312 to enable an element 604 (e.g., a website banner) of the editable elements 310 to be edited. Based on selection of the change banner option 602, an element editing menu 606 is presented that includes various information and editing options for the element 604. The element editing menu 406, for instance, includes the action field 408, the element name field 410, the content field 412, and the recommendation field 414. Example attributes of these fields are discussed above with reference to the scenario 400. In this particular example, the recommendation field 414 recommends changing a font of the content included in the element 604, e.g., the website banner.

Figure 7:
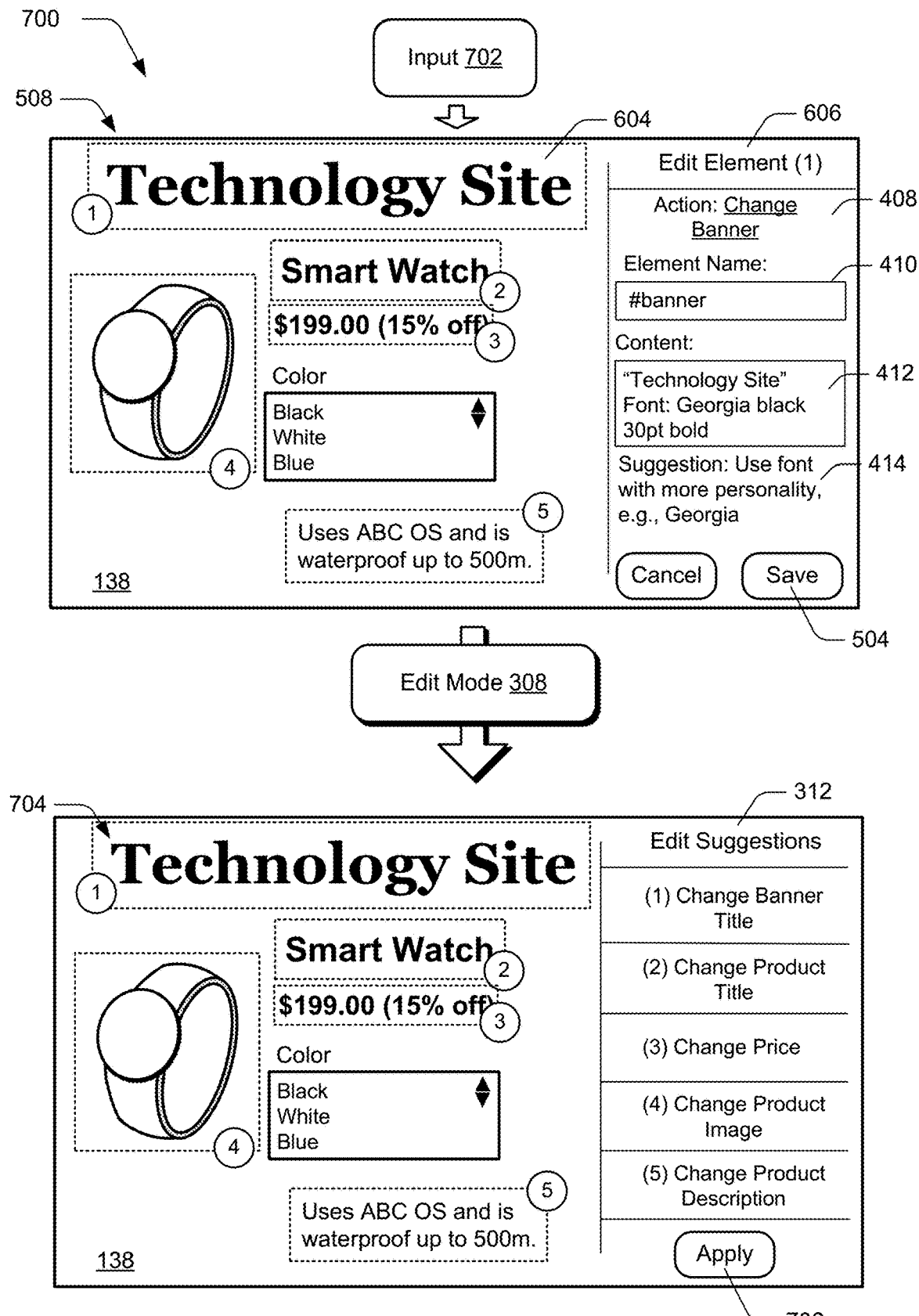
FIG. 7 depicts a scenario for applying edits to an element of a digital document.

FIG. 7 depicts a scenario 700 for applying edits to an element of a digital document. The scenario 700, for example, represents a continuation of the scenarios 300-600 as part of the edit mode 308. In the scenario 700, a user provides input 702 to change the content included in the element 604. The user, for instance, interacts with the content field 412 of the editing menu 606 to change the font used for the content of the element 604. The user then selects the save control 504 which causes the edits to the element 604 to be saved to generate a further edited web page 704, which represents an edited version of the edited web page 508.

In at least some implementations, the various editing interactions described in the scenarios above are performed on a version of the original web page 302 that is offline for editing, e.g., not "live." Accordingly, the user selects an apply control 706 from the suggestions menu 312, which causes the edited web page 704 to be published online, such as for general access via the content platform 106 from which the web page 302 was previously retrieved. The web page 302, for example, is replaced at the content platform 106 with the edited web page 704 such that users can access the edited web page 704 via interaction with the content platform, such as over the Internet.

Figure 8:
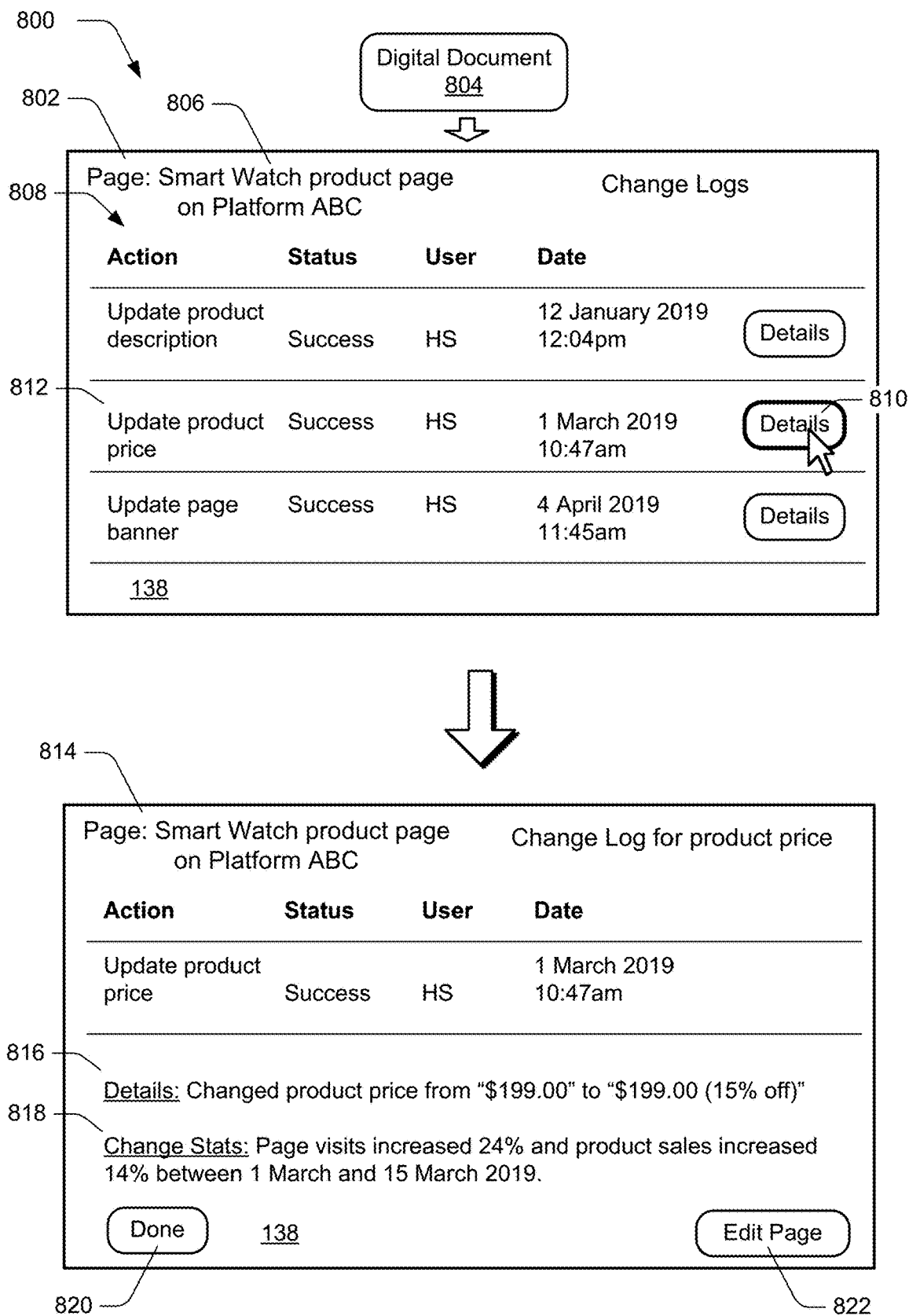
FIG. 8 depicts a scenario for tracking changes to a digital document.

FIG. 8 depicts a scenario 800 for tracking changes to a digital document. The scenario 800, for example, represents a way of tracking and presenting the web page edits described above, and thus can be implemented in conjunction with the scenarios presented above. The scenario 800 includes a change log interface 802 displayed within the content editor GUI 138. Generally, the change log interface 802 includes information about various changes made to a digital document 804. The digital document 804, for example represents an instance of the digital documents 116, such as the web page 302 and/or the edited web page 704.

In this particular example, the change log interface 802 includes a page identification field 806 that identifies the digital document 804 for which changes are presented in the change log interface 802. The change log interface 802 also includes a changes region 808 that identifies the various changes previously made to the digital document 804. The changes region 808, for example, includes an action column that identifies an element and an action applied to the element, a status column that indicates whether a particular change was successful, a user column that identifies a user that applied a respective change, and a date column that indicates a date on which a respective change was applied to the digital document 804. Each entry in the changes region 808 also includes a details control that is selectable to view additional details regarding a respective entry in the changes region 808.

Further to the scenario 800, a user selects a details control 810 from a log entry 812 of the changes region 808. Accordingly, a details interface 814 is presented that includes details about the log entry 812. The details interface 814, for example, includes a details field 816 and a performance stats field 818. The details field 816 identifies the various changes made to an element of the digital document 804. Further, the performance stats field 818 includes statistics regarding the digital document 804 based on the change to the digital document 804 represented by the log entry 812. The information in the performance stats field 818, for instance, represent different performance-related statistics for the digital document 804 over a particular time period after the change to the digital document 804 represented by the log entry 812 was applied. In at least one implementation, information populated to the performance stats field 818 is retrieved from the historical data 122 for the digital document 804.

The details interface 814 includes a done control 820 that is selectable to return to the change log interface 802, and an edit page control 822 that is selectable to edit the page of the digital document 804 represented by the change log interface 802. For instance, selecting the edit page control 822 can transition the digital document 804 into an edit mode, such as described in the scenarios above. In at least one implementation, selecting the edit page control 822 presents an element of the digital document 804 for editing, e.g., the "product price" element represented by the details interface 814.

Accordingly, the various scenarios described above illustrate that techniques for generating edit suggestions for transforming digital documents can be employed to provide simple and intuitive ways to enable users to transform digital documents in different ways.

Figure 9:
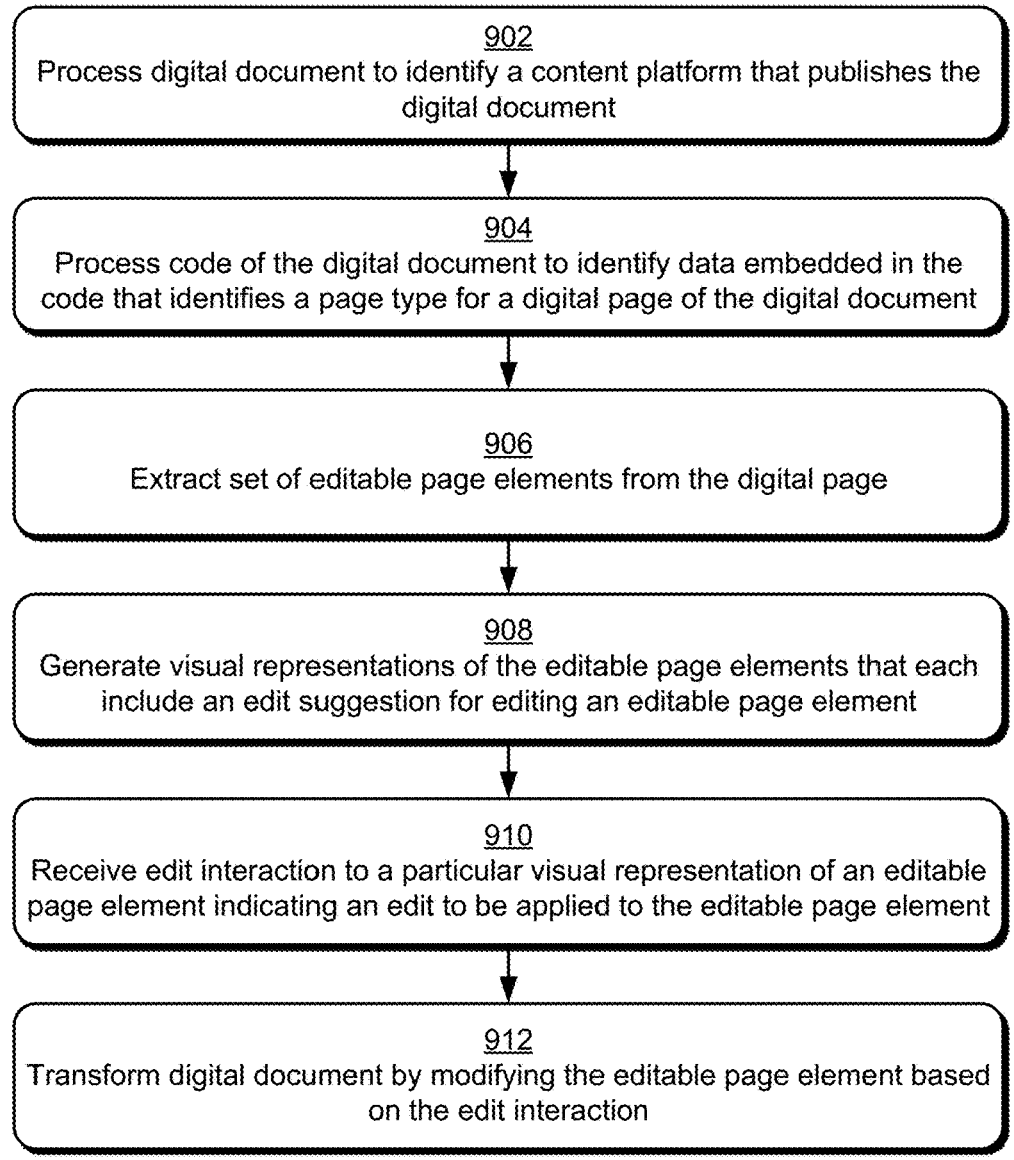
FIG. 9 depicts an example procedure for transforming a digital document based on an edit suggestion.

FIG. 9 depicts an example procedure 900 for transforming a digital document based on an edit suggestion. A digital document is processed to identify a content platform that publishes the digital document (block 902). A user, for instance, interacts with the content editor application 110 to obtain a digital document 116, such as from a content platform 106. The platform identification module 130 then parses the code of a digital document 116 to identify a content platform 106 that is a source of the digital document 116. A tag included in the code (e.g., a metatag), for example, can be identified that specifies a name for a particular content platform 106.

Code of the digital document is processed to identify data embedded in the code that identifies a page type for a digital page of the digital document (block 904). In at least one implementation, the code includes a Document Object Model (DOM) for the digital document. For example, based on the identified content platform, a page type for a particular page 124 to be edited is identified. The page identification module 132, for instance, parses code of a page 124 of the digital document 116 to identify a page type for the page 124. In at least some implementations, different content platforms 106 utilize different page types that can be specific to the content platforms. For instance, the content platforms 106 expose metatags and/or library functions in their respective digital documents 116 that identify specific page types in the digital documents. The following represents example function that can be utilized to determine a page type of a page 124 of a digital document 116:

Function 1—Platform and Page Identification
For a given platform P
check if platform is known set of platforms
If yes, extract page type from the metadata or variable corresponding to platform. Example: window.google_tag_params.ecomm_pagetype;
If not use standard way of extracting meta tags from HTML page and deduce the page type.

As illustrated in Function 1, different page types can be mapped and identified based on the different content platforms.

A set of editable page elements are extracted from the digital page (block 906). The element identification module 134, for example, matches page elements embedded in the code of the digital page to categories of editable page elements identified based on the page type. Generally, different categories of page elements that are available to be edited can be specified, and can be used to ascertain which page elements of a particular page are editable via the content editor application 110. The following represents example function that can be utilized to determine element types for elements 126 of a page 124 of a digital document 116:

Function 2—Element Identification
Input: Page type, Assumption: expected Elements for Page type.
Parse the page to identify major content containers in page. Like header, footer, product content.
Scan the elements of each container, to find each of the expected element.
For Image, parse page to get all images. Identify the image with prominent height and width in container and mark as product Image. Further use attribute like title, class while determining the probability of it being product image.
For price, extract all numeric values with unit of price like 99.9 $.
For title, look above identified product image and price elements. Also, title attributes have specific element type like Heading, Label etc.

Generally, the pseudo code for element identification included in Function 2 depends on page type identified earlier in Function 1 and uses heuristics to identify expected page elements. In the example scenarios described above, the page type is "Product Page," so examples of the expected page elements are Price, Product Image, and Product Title.

Visual representations of the editable page elements are generated that each include an edit suggestion for editing an editable page element (block 908). The suggestion module 136, for example, generates different edit suggestions based on the types of editable page elements. In at least some implementations, the suggestion data 120 includes instances of edit suggestions that are each specific to a type of editable page element. Thus, the suggestion module 136 can retrieve edit suggestions by mapping elements types for the editable page elements to respective edit suggestions in the suggestion data 120.

Using the edit suggestions, a GUI is rendered that includes the digital document with the editable page elements, and visual representations of the editable page elements displayed separately from the digital document. Generally, the visual representations each including an edit suggestion for editing a respective page element of the editable page elements. Examples of the GUI and the visual representations are discussed above with reference to the content editor GUI 138 and the suggestions menu 312, respectively.

An edit interaction is received to a particular visual representation of an editable page element indicating an edit to be applied to the editable page element (block 910). A user, for instance, interacts with a particular visual representation of an editable page element (e.g., in the suggestions menu 312) to enable editing of a respective editable page element. In at least one implementation, a user selects an edit suggestion from the suggestions menu 312, which causes an element editing menu to be presented. The user can then interact with the element editing menu to provide edits to the editable page element, such as to modify digital content of the editable page element. Alternatively or in addition, the user can interact with the editable page element itself to edit the page element.

The digital document is transformed by modifying the editable page element based on the edit interaction (block 912). The content editor application 110, for example, applies the edit to the editable page element to transform the digital document and generate an edited version of the digital document. The client device 102 then communicates the edited digital document to a particular content platform 106 for publishing, such as the content platform 106 from which the digital document was originally obtained for editing.

Figure 10:
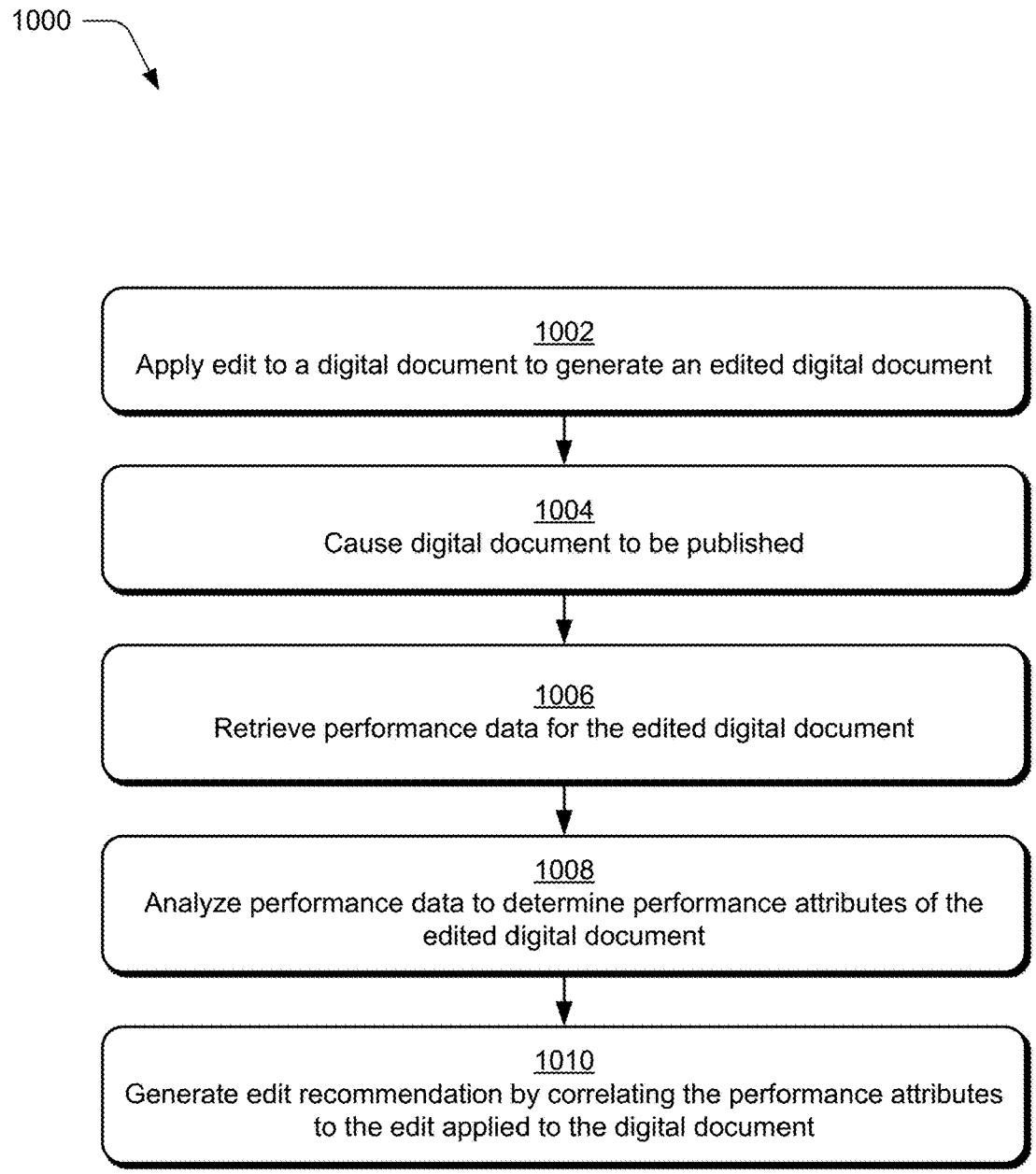
FIG. 10 depicts an example procedure for generating an edit recommendation for a digital document based on historical performance data.

FIG. 10 depicts an example procedure 1000 for generating an edit recommendation for a digital document based on historical performance data. An edit is applied to a digital document to generate an edited digital document (block 1002). A user, for instance, interacts with the content editor application 110 to apply an edit to a digital document and generate an edited digital document, such as described with reference to the procedure 900. Editing the digital document, for instance, includes modifying digital content of a page element of the digital document.

The edited digital document is caused to be published (block 1004). The edited digital document 116, for example, is communicated to a content platform 106, which publishes the edited digital document. Generally, this enables different users to access the edited digital document, such as via the networks 108.

Performance data for the edited digital document is retrieved (block 1006). The content editor application 110, for example, retrieves performance data for the edited digital document from the content platform 106 that publishes the edited digital document. For instance, after the content platform 106 receives and publishes the edited digital document, the content platform 106 tracks various performance-related statistics for the edited digital document, such as numbers of user interactions with the edited digital document. Examples of such user interactions include user visits to the edited digital document, user purchases via the edited digital document, user registrations via the edited digital document, user sentiment expressed regarding the edited digital document (e.g., favorable and unfavorable sentiments), and so forth. The content platform 106 then provides the performance data to the client device 102 for receipt by the content editor application 110.

The performance data is analyzed to determine performance attributes of the edited digital document (block 1008). The content editor application 110, for instance, processes the performance data to identify performance trends over a period of time, such as increases or decreases in user interactions with the edited digital document over a discrete period of time.

An edit recommendation is generated by correlating the performance attributes to the edit applied to the digital document (block 1010). For example, the content editor application 110 generates an edit recommendation that indicates that the edited digital document performed a particular way after the edit was applied to the digital document. The edit recommendation, for instance, may indicate that performance of the digital document increased or decreased after the edit was applied and the edited digital document was published. In at least some implementations, the edit recommendation is generated as a plain text human-readable statement that is stored as part of the suggestion data 120 and that can be displayed by the content editor application 110 as part of editing a different digital document.

Figure 11:
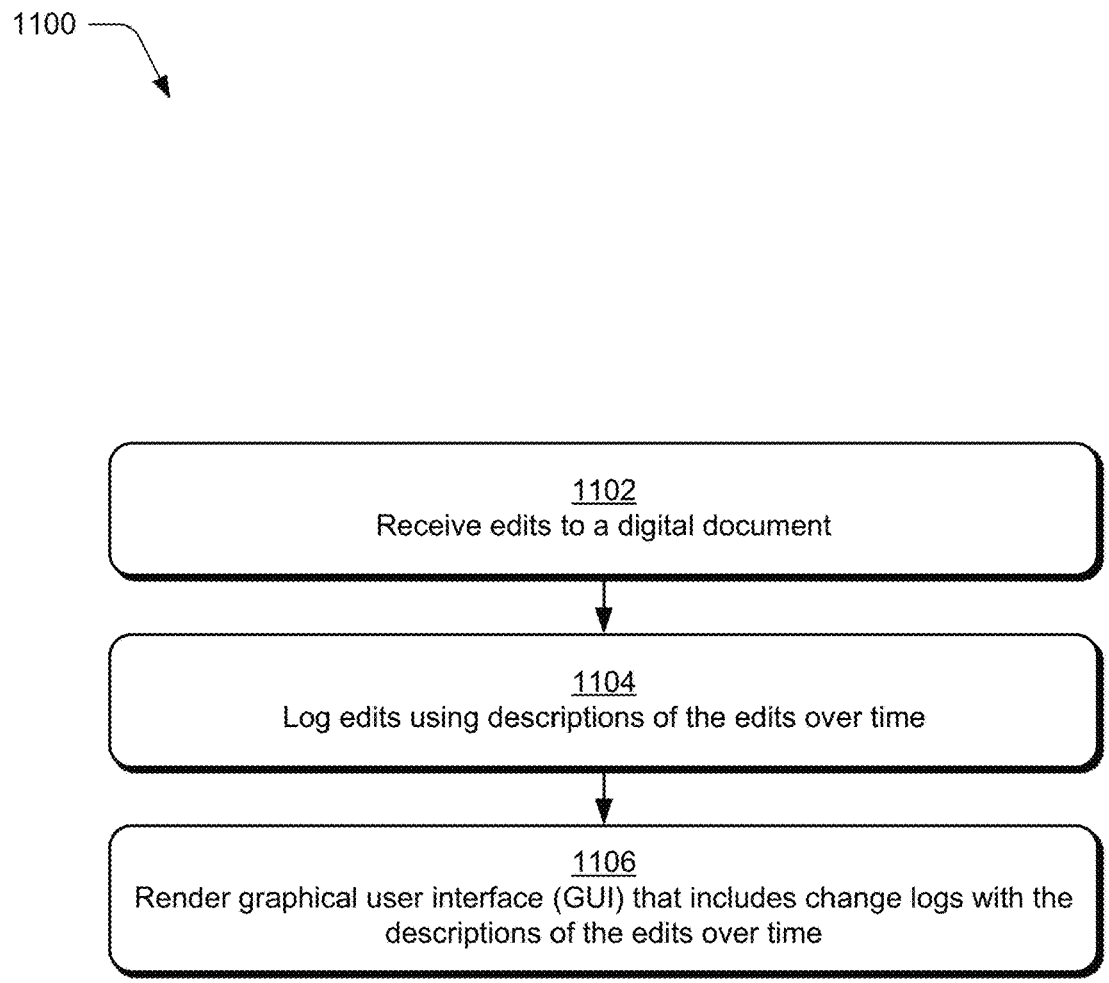
FIG. 11 depicts an example procedure for logging edits to a digital document.

FIG. 11 depicts an example procedure 1100 for logging edits to a digital document. Edits to a digital document are received (block 1102). A user, for instance, interacts with the content editor application 110 to apply edits to a digital document, such as described above. The edits are logged using descriptions of the edits over time (block 1104). The content editor application 110, for example, generates a change log for each edit that includes a plain text description of the edit, an author, a date, and so forth.

A graphical user interface (GUI) is rendered that includes change logs with the descriptions of the edits over time (block 1106). The content editor application 110, for example, generates the change log interface 802 that identifies various edits made to a digital document over time. In at least one implementation, the GUI is rendered to include further details about particular edits, such as described with reference to the scenario 800.

Accordingly, techniques for generating edit suggestions for transforming digital documents provide efficient and intuitive ways for guiding users through editing processes for editing and publishing digital documents.

Discussed above are a number of procedures. Aspects of the procedures described herein may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the client device 102, the content editor service 104, and/or via cooperation between the client device 102 and the content editor service 104.

Having described example scenarios and procedures in accordance with one or more implementations, consider now an example system and device that can be utilized to implement the various techniques described herein.

Example System and Device

Figure 12:
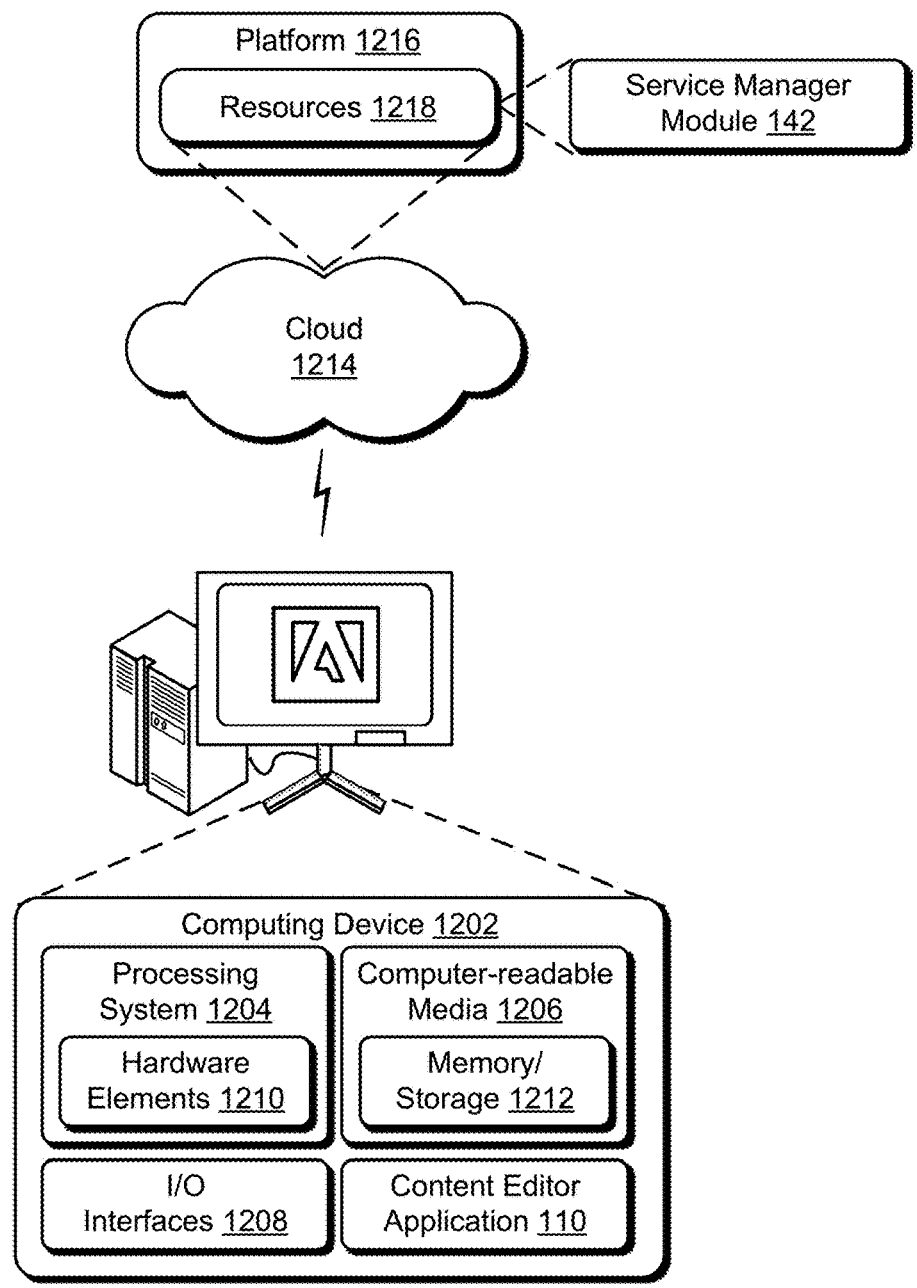
FIG. 12 illustrates an example system including various components of an example device that can be implemented as any type of computing device as described and/or utilized with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the content editor application 110 and the service manager module 142. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. [oioi] As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to transform a digital document based on an edit suggestion, a method implemented by at least one computing device, the method comprising:
    processing, by the at least one computing device, code of a digital document to identify data embedded in the code that identifies a network-based platform that publishes the digital document, wherein the network-based platform is identified and differentiated from multiple different network-based platforms that publish digital documents;
    determining a page type that is specific to the identified network-based platform for a digital page of the digital document;
    extracting, by the at least one computing device, a set of editable page elements from the digital page by matching page elements from the digital page to categories of editable page elements, wherein the categories of editable page elements are identified based on the page type of the identified network-based platform;
    generating, by the at least one computing device, visual representations of the editable page elements that each include an edit suggestion for editing a respective page element of the editable page elements; and
    transforming, by the at least one computing device, the digital document by modifying a particular editable page element based on an edit interaction with one or more of the particular editable page element or a respective visual representation of the editable page element.

2. A method as described in claim 1, wherein the data embedded in the code comprises one or more of a metatag or a library function that identifies the page type.

3. A method as described in claim 1, wherein said extracting the set of editable page elements comprises parsing, by the at least one computing device, a document object model (DOM) of the digital page to identify the editable page elements from the DOM.

4. A method as described in claim 1, wherein a particular edit suggestion includes a plain text description of an edit recommendation for editing a respective editable page element.

5. A method as described in claim 1, further comprising determining, by the at least one computing device, an edit recommendation for the respective page element based on historical performance data for other instances of digital pages that include page elements in a category of editable page elements represented by the respective page element.

6. A method as described in claim 5, wherein the historical performance data indicates how a particular edit to the page elements of the other instances of digital pages affected user interaction with the other instances of digital pages.

7. A method as described in claim 1, further comprising:
rendering, by the at least one computing device, a graphical user interface (GUI) that includes the digital document with the editable page elements, and the visual representations of the editable page elements separately from the digital document; and
receiving, by the at least one computing device, the edit interaction as input to the respective visual representation of the editable page element.

8. A method as described in claim 1, further comprising:
rendering, by the at least one computing device, a graphical user interface (GUI) that includes change log entries for previous edits to the editable page elements; and
displaying, by the at least one computing device, an effect affect of a particular edit to a particular editable page element on performance of the digital page.

9. A system implemented in a digital medium environment to provide edit suggestions for transforming a digital document, the system comprising:
at least one processor; and
memory having stored thereon computer-readable instructions that are executable by the at least one processor to perform operations comprising:
processing code of the digital document to identify data embedded in the code that identifies a network-based platform that publishes the digital document, wherein the network-based platform is identified and differentiated from multiple different network-based platforms that publish digital documents;
determining a page type that is specific to the identified network-based platform for a digital page of the digital document;
extracting an editable page element from a digital page by matching the editable page element to a category of editable page elements identified based on the page type of the digital page of the digital document, wherein said extracting the editable page element from the digital page comprises matching the editable page element from the digital page to a category of editable page elements identified based on the page type of the identified network-based platform;
determining an edit suggestion for editing the editable page element, and an edit recommendation for how to edit the editable page element based on historic performance data for other instances of digital pages that include page elements in the category of editable page elements, the historic performance data indicating that an increase in user interactions with one or more of the other instances of digital pages occurred after the edit recommendation was applied to one or more page elements in the category of editable page elements in the one or more of the other instances of digital pages;
generating, by the at least one computing device, a visual representation of the editable page element that includes the edit suggestion and the edit recommendation; and
transforming the digital document by modifying the editable page element based on an edit interaction with the visual representation of the editable page element.

10. A system as described in claim 9, wherein said matching the editable page element to a category of editable page elements comprises:
processing the code of the digital document to identify data embedded in the code that identifies the page type and that includes page elements of the digital page; and
comparing the page elements to multiple different categories of editable page elements to match the editable page element to the category of editable page elements.

11. A system as described in claim 9, wherein the historic performance data comprises an indication of an effect of a particular edit on performance of the one or more of the other instances of digital pages, and wherein the operations further comprise rendering a graphical user interface (GUI) that identifies the particular edit and the effect of the particular edit on performance of the one or more of the other instances of digital pages.

12. A system as described in claim 9, wherein said transforming generates an edited digital document, and wherein the operations further comprise:
ascertaining performance attributes of the edited digital document based on user interactions with the edited digital document; and
generating performance data that associates the edit interaction with the performance attributes for the edited digital document.

13. A system as described in claim 9, wherein the user interactions comprise one or more of user visits to the one or more of the other instances of digital pages, user purchases via the one or more of the other instances of digital pages, or user registrations via the one or more of the other instances of digital pages.

14. A system as described in claim 9, wherein said extracting the set of editable page elements comprises parsing, by the at least one computing device, a document object model (DOM) of the digital page to identify the editable page elements from the DOM.

15. In a digital medium environment to transform a digital document based on an edit suggestion, a method implemented by at least one computing device, the method comprising:
processing, by the at least one computing device, a digital document to identify a content platform that publishes the digital document, wherein the content platform is identified and differentiated from multiple different network-based platforms that publish digital documents;
extracting, by the at least one computing device, a set of editable page elements from a digital page of the digital document;
presenting, by the at least one computing device, an edit prompt that identifies the identified content platform that publishes the digital document, identifies a page type for the digital page of the digital document, and includes selectable control that is selectable to initiate an edit mode for the digital page;

rendering, by the at least one computing device and in response to selection of the selectable control, a graphical user interface (GUI) that includes the digital page with the editable page elements, and visual representations of the editable page elements displayed separately from the digital page, the visual representations each including an edit suggestion for editing a respective page element of the editable page elements;

receiving, by the at least one computing device, input to a particular visual representation of an editable page element, the input indicating an edit to be applied to the editable page element; and transforming, by the at least one computing device, the digital page by modifying the editable page element based on the input.

16. A method as described in claim 15, further comprising:

rendering, by the at least one computing device, an edit menu in response to the input to the visual representation of the editable page element; and receiving, by the at least one computing device, content input to the edit menu, wherein said transforming comprises modifying the editable page element with the content.

17. A method as described in claim 16, wherein said rendering the edit menu comprises including in the edit menu a recommendation for editing the editable page element.

18. A method as described in claim 15, wherein said receiving input to the particular visual representation and said modifying the editable page element are performed independent of user interaction with the digital document.

19. A method as described in claim 15, wherein the GUI further includes a recommendation for editing a particular editable page element in a category of editable page elements, wherein the recommendation is based on historic performance data for other instances of digital pages that include page elements in the category of editable page elements, the historic performance data indicating that an increase in user interactions with one or more of the other instances of digital pages occurred after the edit recommendation was applied to one or more page elements in the category of editable page elements in the one or more of the other instances of digital pages.

20. A method as described in claim 19, wherein the user interactions comprise one or more of user visits to the one or more of the other instances of digital pages, user purchases via the one or more of the other instances of digital pages, or user registrations via the one or more of the other instances of digital pages.

* * * * *